United States Patent [19]
Strothmann

[11] Patent Number: 5,815,144
[45] Date of Patent: Sep. 29, 1998

[54] ICON-BASED RESET FOR CARTRIDGE MEMORY COMPUTER SYSTEM

[75] Inventor: James Alan Strothmann, Lexington, Ky.

[73] Assignee: International Business Machines Corporation, Armonk, N.Y.

[21] Appl. No.: 474,408

[22] Filed: Jun. 7, 1995

[51] Int. Cl.⁶ .................................................. G06F 3/00
[52] U.S. Cl. ................................................................ 345/326
[58] Field of Search ........................... 395/155, 161; 273/148 B

[56] References Cited

U.S. PATENT DOCUMENTS

| | | | |
|---|---|---|---|
| 4,516,777 | 5/1985 | Nikora | 463/46 |
| 4,593,376 | 6/1986 | Volk | 273/148 B |
| 4,767,341 | 8/1988 | Lund | 439/60 |
| 4,922,420 | 5/1990 | Nakagawa et al. | 273/148 B |
| 5,056,029 | 10/1991 | Cannon | 395/155 |

*Primary Examiner*—Phu K. Nguyen
*Assistant Examiner*—Cliff N. Vo
*Attorney, Agent, or Firm*—Calfee, Halter & Griswold LLP

[57] ABSTRACT

A computer system is provided which allows a user to perform a system reset without performing a manual physical reset of the computer system. The computer system comprises a central processing unit (CPU), a removable memory circuit, an I/O coprocessor, an input device, and an system manager having a system management icon, system management menu, and a pointing icon. The system management menu provides a user with option for restarting a program application, resetting the computer system, inserting a new cartridge without physically resetting the computer system, and exiting the menu system.

13 Claims, 5 Drawing Sheets

ICON-BASED RESET FOR CARTRIDGE MEMORY COMPUTER SYSTEM

FIELD OF THE INVENTION

The present invention relates generally to cartridge based computer systems and, more specifically, to an icon-based reset for a cartridge based computer system.

BACKGROUND OF THE INVENTION

Video graphics computer systems are well known, popular consumer products. A typical system includes a data processing unit that connects to an ordinary television set for displaying images of a game or other application. The data processing unit receives controlling software from a read only memory (ROM) that is usually packaged in the form of a cartridge. The cartridge is removably plugged into the data processing unit. At least one pointing device, such as a mouse, joystick, touchpad, touchscreen, switch pad, or light gun, is also connected to the data processing unit to allow the player to input positional information that is used by the controlling software to execute the application.

The data processing unit typically has a single central processing unit (CPU) and associated volatile and non-volatile memory, including all random access memory (RAM) and bootstrap read-only memory (boot ROM), a television (RF video) signal generator, and an input/output (I/O) processor to interface to the various pointing devices. These devices are in circuit communication. One distinguishing characteristic of these systems is the use of a motherboard or system planar to electrically connect these components together.

Joysticks are directional type pointing devices used to input directional data to computer systems. Joysticks typically comprise a base and an elongated "stick," which is typically gripped by the hand of the user. The "stick" typically pivots from a point at the base and has a default position perpendicular to the base. Pivotal motions of the stick away from the default perpendicular position are interpreted as a directional input parallel to the base in the direction needed to displace the stick from the default perpendicular position. Typically a button is located at the top portion of the stick. Closure events of switches associated with the button and stick are used as control inputs for applications executing on the computer system. Moreover, joysticks are typically combined only with switches and other closure type input devices.

Consumer video graphics computer systems have been traditionally been designed to require a physical intervention by the user in order for the system to be reset. Conditions under which a reset may be appropriate include changing program memory cartridges. Such computer systems have, however, lacked the ability to be perform resets, restarts, and selection of different program cartridges through software control.

SUMMARY OF THE INVENTION

According to the present invention, a System Manager for a program memory cartridge based computer system is provided. The System Manager includes a System Management icon, System Management menu, and a movable pointing icon. The System Management icon allows a user to access System Management menu via the movable pointing icon. Once the System Management menu is displayed, the movable pointing icon is used by the user to select from the plurality of System Management Options. The user is now allowed to effectively control the computer system's operating system from within an application program.

The System Management Menu includes the following options: Restart Game, Reset System, New Cartridge, and Exit Menu. The System Management Menu is of a "window" like nature and displayable only when active. Furthermore, the System Management Menu may appear anywhere on a display screen and always appears in the foreground.

The System Manager allows a user to, among other things, reset, restart, or select a different program memory cartridge without the physical intervention of the user. The user may simply choose the desired option from the System Management Menu which the user desires the computer system's operating system to perform.

It is therefore an advantage of the present invention to provide an computer system which does not require manual intervention by a user to perform a user initiated system reset.

It is therefore a further advantage of the present invention to allow a user to control a computer system's operating system from within application programs.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

DETAILED DESCRIPTION OF THE PREFERRED EMBODIMENTS

Figure 1A:
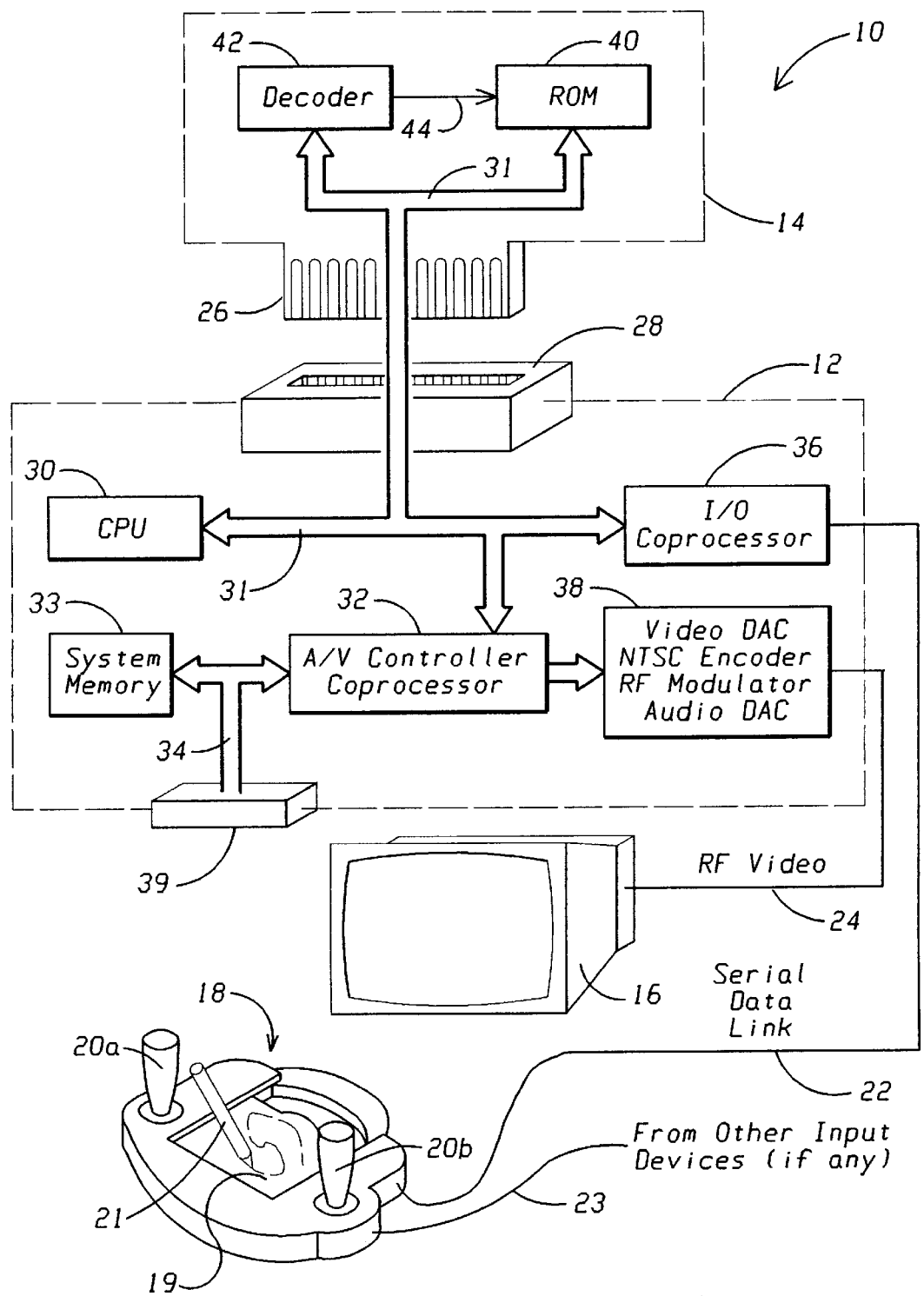
FIGS. 1A and 1B are block diagrams showing the general layout of the system of the present invention.
Figure 1B:
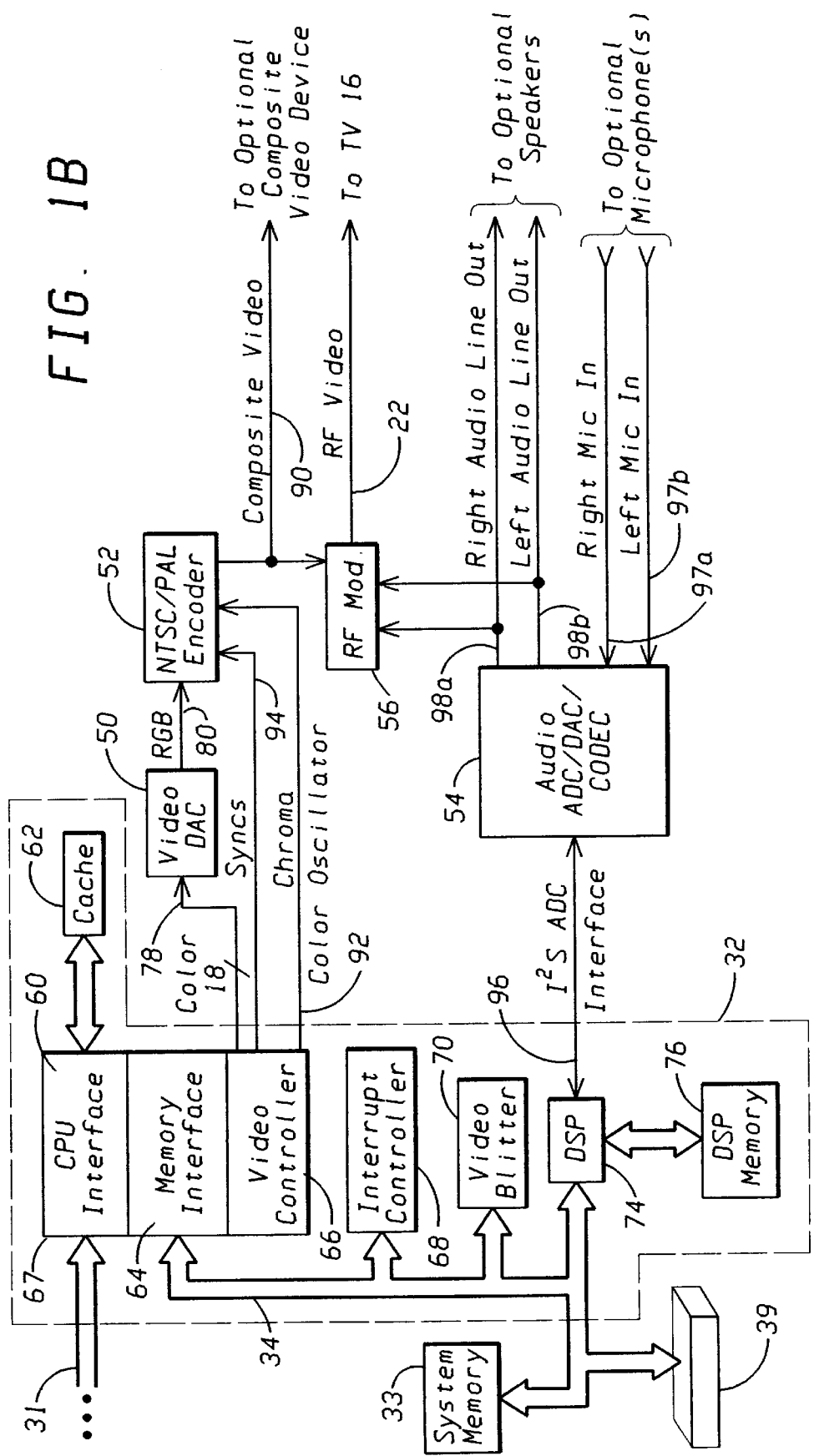

Referring to FIGS. 1A and 1B, a computer system 10 of the present invention is shown. As shown in FIG. 1 A, the system 10 comprises a data processing unit 12 with a program cartridge 14 removably connected thereto. Also connected to the data processing unit 12 is a standard television set (TV) 16, and an input device 18, which has a touchpad 19 and two joysticks 20a, 20b. The input device 18 sends to the data processing unit 12 directional coordinate type data corresponding to movements of the stylus 21 on the touchpad 19. In addition, the input device 18 sends to the data processing unit 12 directional type data corresponding to movements of the joysticks 20a, 20b. Although not shown in FIG. 1A, the standard TV 16 can be replaced with a pair of speakers and a display device that accepts a composite video signal. The input device 18 connects to the data processing unit 12 via a serial data link 22. The TV 16 connects to the data processing unit 12 via an RF video line 24.

The cartridge 14 has an edge card connector, indicated generally at 26, which connects to a cartridge connector 28 thereby electrically connecting devices in the cartridge 14 to devices in the data processing unit 12.

The processing unit 12 comprises a central processing unit (CPU) 30, having a SYSTEM bus 31 associated therewith, an audio/video (A/V) controller/coprocessor 32, a system memory 33, which is connected to a SYSTEM' bus 34 generated by the A/V controller/coprocessor 32 from the SYSTEM bus 31, first and second decoder chips (not shown), an I/O coprocessor 36, two cartridge connectors (one indicated at 28, the other not shown), additional circuitry 38 required to generate the audio and video signals, and an expansion connector 39. These devices are connected in circuit communication as shown in the Figures. The additional circuitry 38 is shown in FIG. 1B and discussed in more detail in the text accompanying FIG. 1B.

The CPU 30 generates multiple buses: a DATA bus, an ADDRESS bus, and a CONTROL bus, as are well known in the art. These three buses are collectively referred to as the SYSTEM bus 31. In the preferred embodiment, the CPU 30 is an 80376, manufactured by Intel Corp., 3065 Bowers Ave., Santa Clara, Calif., 95051. The 80376 is a variation of the well known 80386SX, which is well known in the art and also available from Intel Corp. The 80376 differs from the 80386SX in that the 80376 starts up in 32-bit mode, rather than 16-bit mode. Specifically, the CRO register is forced to a 0011H (0011 in hexadecimal notation) state with bit 0 forced to a logical ONE, effectively making the 376 operate in a 32-bit memory mode. Paging is enabled to allow virtual 386 operation.

The A/V controller/coprocessor 32 generates three spare general purpose I/O decoder lines (GPIO1, GPIO2, and GPIO3) from the SYSTEM bus 31, each providing a 32-bit I/O address range. The general purpose decoders can be used to provide three active low chip enables to devices external to the A/V controller/coprocessor 32. In the data processing unit 12, the general purpose decoders are used to decode address ranges to the I/O coprocessor 36 (GPIO1) and the two cartridge connectors (GPIO2 and GPIO3). The remaining circuitry of the A/V controller/coprocessor 32 is discussed below.

The system memory 33 comprises screen RAM, system RAM, and bootstrap ROM (all not shown). The on-board screen RAM and system RAM is 1 megabyte of 32-bit DRAM. Suitable DRAM are a pair of TCS14170BJ 256 kilobyte by 16-bit memory chips, manufactured by Toshiba, configured to provide a 32-bit memory. A portion of the address space of the CPU 30 is decoded to a number of eight-bit registers within the A/V controller/coprocessor 32. All internal locations are on even address boundaries; word-wide I/O reads and writes can be performed where appropriate. In this particular embodiment, the byte-wide writes cannot be performed on word-wide registers and I/O cycles cannot be used to access odd addresses.

The bootstrap ROM is always 16 bits wide. The bootstrap ROM comprises two 27C512 erasable programmable read-only memories, manufactured by numerous manufacturers, thereby giving 128K of bootstrap ROM. Following a reset, the one megabyte window from F20000H to FFFFFFH containing ROM and internal memory is repeated throughout the 16 megabyte address range.

The system memory 33 is shared between a number of devices. The A/V controller/coprocessor 32 is the arbitrator for the system memory 33; therefore, the SYSTEM bus 31 is modified to a SYSTEM' bus 34 (comprising a DATA' bus, an ADDRESS' bus, and a CONTROL' bus, all not shown) by the A/V controller/coprocessor 32. Thus, the system memory 33 is accessed via the SYSTEM' bus 34.

The I/O coprocessor 36 interfaces the CPU 30 to numerous input devices, such as the input device 18 and optional devices such as a keyboard (not shown), controllers (not shown), a mouse (not shown), and a printer (not shown). In the preferred embodiment, the I/O coprocessor 36 is a preprogrammed MC68HC705C8 (hereinafter "68HC705"), manufactured by Motorola Corp, running at 2 MHz. The 68HC705 I/O coprocessor 36 is interfaced to the CPU 30 by configuring the 68HC705 as a peripheral device: (1) PA0–PA7 are connected to D0–D7 of the DATA bus; (2) PB7, PB1, and PB2 are connected to GPIO1 (a 32-byte address range decoded by the A/V controller/coprocessor 32, as described below), A1, and A2, respectively, of the CONTROL bus and ADDRESS bus; and (3) PB3, PB4, and PB5 are connected to ADS, READY, and W/R, respectively, of the CONTROL bus. The I/O coprocessor 36 is decoded by the A/V controller/coprocessor to have four 16-bit addresses in I/O space (referred to herein as AS0, AS2, AS4, and AS6).

The program inside the 68HC705 interfaces to the CPU 30 as follows. The 68HC705 is designed to attach directly to the processor bus and act as an I/O port to the CPU 30. A pair of internal latches holds data passing between each of the processors until the other is ready to receive it. Status bits to each processor indicate the condition of the data latches. Each can tell if the previous data has been read and if any new data is waiting to be read by checking the status bits.

The I/O coprocessor 36 implements, inter alia, the following functions: (1) a 50 ms timer, (2) a serial controller link for receiving communication packets from the input devices, (3) a cartridge/expansion sense, for determining the presence or absence of a cartridge 14 in each cartridge connector and the presence or absence of an expansion device or CD drive in the expansion connector, (4) a system reset, and (5) an I$^2$C nonvolatile RAM (NVRAM) interface. The I/O coprocessor 36 also implements an optional DSA compact disk control serial line to allow communications with an optional CD device.

The 50 ms timer is implemented by configuring the watchdog timer of the 68HC705 I/O coprocessor 36 to expire at regular 50 millisecond intervals. Each time the watchdog timer expires, the I/O coprocessor 36 interrupts the CPU 30 using analog interrupt 0 (AI0) of the A/V controller/coprocessor 32 (the A/V controller/coprocessor interrupts the CPU via the IRQ line in response to the I/O coprocessor pulling AI0 low). The CPU enables and disables the 50 ms timer by writing either the byte 0F0H or the byte 00H, respectively, to the I/O port AS0. The timer defaults to being enabled.

During the interrupt acknowledge cycle of the CPU, the A/V controller/coprocessor asserts the address of the interrupt handling routine. The interrupt handling routine causes the CPU 30 to read one or more bytes from the 16-bit I/O port AS0, which corresponds to the I/O coprocessor. During each read of I/O port AS0, the A/V controller/coprocessor 32 selects the I/O coprocessor 36, thereby allowing a data transfer between the CPU 30 and the I/O coprocessor 36.

The I/O coprocessor 36 will always have one byte to be transferred to the CPU in response to the 50 ms interrupt. The lower nibble of this byte contains the number of expirations of the 50 ms time since the last interrupt acknowledge cycle and the upper nibble of this byte contains the number of I/O device messages to be transferred to the CPU. If the 50 ms timer is disabled, then the lower nibble of this byte will be zero. If more than 15 messages have been received, then 15 is sent in the upper nibble and any, remaining messages are sent during the next transfer. Depending on the contents of this first byte, the CPU might read subsequent bytes from the I/O coprocessor 36, which will, for the most part, be packets of data from input devices. Typically, the input devices will only send messages when their respective states change, thereby keeping message transmission frequency very low.

The input device 18 and all other input devices are connected to the I/O coprocessor 36 via the serial data link 22. The individual input devices (e.g., the input device 18) transform the movements of the control devices into a format suitable for transmission along the serial link 22. The input device 18 sends data packets via the serial data link 22 to the system unit 12. As will be explained below, the structure of the data packets differ depending on the type of input device. Coordinate type devices (mouse, analog joystick, touchpad, etc) have a different data packet structure than a switch closure type of device (keyboard, digital joystick, switch pad, etc).

The serial controller link 22 consists of three (3) lines: a data receive line, a VCC (+5 VDC) line, and a ground line. The 68HC705 implements the data receive line of the controller serial link using the PD0/RDI pin of the 68HC705. This pin is designed to be used as an interface to serial devices using the well known asynchronous format. Serial transmissions have the following format: 4800 bits per second, no parity, 8 data bits, and one stop bit. A clocked synchronous format could be used in the alternative. The serial controller link 22 is connected to external devices by a six-conductor mini-din plug connector (not shown), which are well known in the art. Input devices are daisy chained, thus a single device physically connects to the data processing unit 12. For example, if a so-called mouse pointing device is added to the system 10, the mouse is connected to the input device 18, which is connected to the processing unit 12.

The cartridge sense and expansion sense are for determining the presence or absence of a cartridge 14 in each cartridge connector or the expansion connector and is implemented by having the I/O coprocessor 36 poll a pin of the cartridge connector 28. The pin is pulled to a logical ONE by a suitable pullup resistor (not shown) on the system planar and a properly connected cartridge 14 pulls the pin to a logical ZERO. Thus, a ONE at each cartridge sense indicates the absence of a cartridge 14 and a ZERO indicates the presence of a cartridge 14. Likewise, a ONE the expansion sense indicates the absence of an expansion device, such as an optional CD drive, and a ZERO indicates the presence of an expansion device.

The I/O coprocessor 36 implements an $I^2C$ nonvolatile RAM (NVRAM) interface to read, write, and verify the contents of 512 bytes of nonvolatile system RAM. The NVRAM (not shown) comprises a PCF8594 manufactured by Philips Semiconductor and is in circuit communication with the I/O coprocessor via the $I^2C$ interface. More than one PCF8594 can be cascaded to provide more NVRAM capability. To access the NVRAM, a three-byte sequence is used. All three bytes are accessed through I/O port ASO. The first byte written to the I/O coprocessor by the CPU indicates whether the transfer is a read or a write and gives the I/O coprocessor a segment address. The lower nibble of this byte indicates the type of transfer: 01H indicates a write from NVRAM and 02H indicates a read from NVRAM. The upper nibble of this byte is a 4-bit segment number corresponding to a 256-byte segment of NVRAM. With 512 bytes of NVRAM, only the bottom two segments (0 and 1) are used. For both reads and writes, the next byte is the same—the next byte is written by the CPU and is the address of the byte being accessed within the segment. The last byte is either written to or read from the I/O coprocessor by the CPU and is the data byte read from or to be written to the NVRAM.

In the alternative, the I/O coprocessor can be implemented in other ways. For example, a tristated readable shift register might suitably receive the information from the serial data link 22. In that case, the CPU 30 periodically reads the shift register to access the data packets from input devices.

The first decode chip (not shown) is in electrical circuit communication with the CPU 30, the A/V controller/ coprocessor 32, and the two cartridge connectors 28 (the other not shown). The first decode chip accepts as inputs the upper two address lines of the SYSTEM bus 31, decodes the 16 megabyte address space of the 80376 CPU 30 into four 4 megabyte regions, represented by three chip select lines: two for the cartridge connectors 28 (the other not shown) and one for the A/V controller/coprocessor 32. The upper four megabytes and the lower four megabytes are decoded to the A/V controller/coprocessor chip select and the two remaining four-megabyte regions are decoded to two cartridge connector chip selects.

The second decoder chip (not shown) is used to implement the chip select for the expansion connector 39. The second decode chip is in circuit communication with the A/V controller/coprocessor 32 and the expansion connector 39 along the SYSTEM' bus 34. The second decode chip permits the A/V controller/coprocessor 32 to decode a 128K block of system ROM starting at F20000H. The range from F40000H to FFFFFFH is decoded by the second decode chip for use by the expansion connector 39. This block of ROM, decoded by the second decode chip is used to add ROM to the system 10 via the expansion connector 39.

The data processing unit 12 also has a pair of cartridge connectors (one indicated at 28, the other not shown) for placing a cartridge 14 in circuit communication with the CPU 30 and other system components. The cartridge 14 connects to the connector 28 of the data processing unit 12 via a gold plated 62-pin (two rows of 31 conductors) edge card connector 26. The processor unit 12 has two cartridge connectors 28 for accepting the edge card connections of the edge card connector 26. The cartridges 14 have gold plated card edge connections to match the conductors of the connectors 28, allowing the cartridges 14 to be pluggably connected to the processor unit 12. The following signals are communicated to external devices via the cartridge connectors 28 (the other not shown): SYSTEM bus 31 signals, a cartridge sense line, power, ground, analog interrupt 1 or 2 (each cartridge has a unique interrupt), GPIO 2 or 3 (each cartridge has a unique chip select), a lock line (which is a typical signal of the 80376 and 80386SX SYSTEM bus 31), and a cartridge select, which is generated by the first decode chip. In the alternative, the signals needed to connect to an optional CD drive can also be connected to external devices via the cartridge connector 28.

In addition, the processor unit 12 has a single 112-pin (two rows of 56 pins each) edge card expansion connector 39. The expansion connector 39 allows devices to add more memory to the system memory 33 and to add various other features. Devices connected to the expansion connector 39 have gold plated card edges to match the expansion connector, allowing the devices to be pluggably connected to the processor unit 12. The following signals are communicated to external devices via the expansion connector 39: SYSTEM' bus signals, an expansion connector 39 sense line, power, ground, CAS and RAS lines, and an expansion connector 39 select, which is generated by the second decode chip. In the alternative, the signals needed to connect to an optional CD drive can also be connected to external devices via the expansion connector 39.

The program cartridge 14 comprises a program ROM 40 and a decoder 42. In the alternative, the decoder 42 can be designed into the processing unit 12. The program ROM 40 contains code suitable for execution on the CPU 30 in a read only memory format. In the alternative, other memory types, such as battery-backed RAM can be used as the storage device in the cartridge 14. The program ROM 40 is in circuit communication with the CPU 30, as shown in FIG. 1A.

The address decoder 42 within the cartridge 14 decodes the full width of the ADDRESS bus to a memory range appropriate for the program ROM 40 and generates a chip select signal 44 required by the ROM 40, as is well known in the art. The address decoder 42 is implemented in a 16V8 programmable array logic (PAL), which is well known in the art and is manufactured by numerous manufacturers, e.g., AMD Corp. If the decoder 42 is designed into the processing unit 12, then the select 44 is electrically communicated to the ROM 40 by the connector 26.

Referring now to FIG. 1B, the additional circuitry 38 of FIG. 1A is shown connected to the A/V controller/coprocessor 32. The additional circuitry 38 comprises four devices: a video digital-to-analog converter (video DAC) 50, an NTSC/PAL ("PAL" referring to the well known European television signal standard) encoder 52, an audio digital-to-analog converter/analog-to-digital converter/compressor/decompressor (ADC/DAC/CODEC) 54, and an RF modulator 56. Each is connected as shown in the Figures.

The Audio/Video controller/coprocessor (A/V controller/coprocessor) 32 electronics are largely contained within one massive custom logic chip, known as an ASIC (Application Specific Integrated Circuit). An A/V controller/coprocessor 32 meeting the description herein can be purchased from MSU Ltd., 270 Upper 4th Street, Witan Gate West, Central Milton Keynes, MK9 1DP England. The A/V controller/coprocessor 32 contains a processor interface 60, a processor cache 62, a memory interface/refresh 64, a video controller 66, an interrupt controller 68, a video blitter 70, an optional CD block decoder, a digital signal processor (DSP) 74, and a DSP memory 76. The processor interface 60, the memory interface/refresh 64, and the video controller 66 are referred to collectively as the video/memory controller 67. The system memory 33, central processing unit 30, and other devices lie outside the A/V controller/coprocessor 32.

The A/V controller/coprocessor 32 generates the SYSTEM' bus 34 from the SYSTEM bus 31, thereby isolating the CPU 30 from the system memory 33. Thus, the SYSTEM' bus 34 electrically connects the various devices to the system memory 33. Sharing the SYSTEM' bus 34 are six possible bus masters (in order from highest priority to lowest priority, respectively): the memory refresh 64, the video controller 66, an optional CD block decoder (not shown), the DSP 74, the blitter 70, and the CPU 30 (through the processor interface 60). Only one of the bus masters can control the SYSTEM' bus 34 at any one time. The arbitrator within the video/memory controller 67 controls the changing priorities of the devices, as described herein, and is in electrical circuit communication with all the devices within the A/V controller/coprocessor 32. For example, the CPU 30 has the lowest priority of all bus masters until an interrupt occurs. Thus, the arbitrator is in circuit communication with both the CPU interface 60 and the interrupt controller 68.

The cache 62 is not a cache in the sense that it prefetches instructions for the CPU 30. Rather, the cache 62 is a 512×16-bit static RAM located at F14000H to F143FFH that can be used by the CPU 30 for variables, stack, or program code to speed up program execution.

The video/memory controller 67 (the processor interface 60, the memory interface/refresh 64, and video controller 66) controls the SYSTEM' bus 34, and provides the memory timing signals (e.g., CAS, RAS, write enable, etc.) for memory devices attached to the SYSTEM' bus 34, as is well known in the art. It suspends bus master operations during video lines for brief periods to fetch any video display data, and to refresh dynamic RAM (DRAM). It also controls the interface with the CPU 30.

The video controller 66 has a flexible video timing generator that can be programmed to suit different TV standards and monitors up to a 640 by 480 VGA standard. The exact video format is controlled by setting various registers in the A/V controller/coprocessor: horizontal period, horizontal sync, horizontal blanking end, horizontal blanking begin, horizontal display begin, horizontal display end, horizontal fetch begin, horizontal fetch end, horizontal vertical sync, vertical period, vertical sync, vertical blanking end, vertical blanking begin, vertical display begin, vertical display end, video interrupt, and light pen registers. The video controller 66 has three color resolutions available: four bits per pixel, eight bits per pixel, and 16 bits per pixel. The memory map of the screen is not tied to the video display width, but is defined independently.

The video/memory controller 67 decodes the 16 megabyte address range of the 80376 CPU 30 into the following memory map: 1 MB of system RAM (000000H–0FFFFFH), 4 MB for the first cartridge ROM (400000–7FFFFFH), 4 MB for the second cartridge ROM (800000–BFFFFFH), 64 KB of internal memory for the audio/video controller/coprocessor (F10000H–F1FFFFH), and a 128 KB block of system ROM (FE0000H–FFFFFFH). The 64 kilobytes of internal memory comprises palette RAM, blitter registers, and DSP registers and memory. The palette address range was stated above. The blitter registers extend from the range F10400H to F107FFH. The DSP memory extends from F10800H to F18000H.

if the optional CD drive is added to the system, the following regions are added to the memory map: another 1 MB of system RAM (100000H–1FFFFFH) and 128 KB for the CD drive (FC0000H–FDFFFFH).

The interrupt controller 68 interfaces six internal interrupts to the CPU 30: video interrupt (highest priority), analog interrupt 0 (AI0), analog interrupt 1 (AI1), analog interrupt 2 (AI2), CD block decoder interrupt, and DSP interrupt (lowest priority). The interrupt controller automatically clears an interrupt when the CPU 30 performs the interrupt acknowledge cycle. A mask bit is available for each of the interrupts.

The bitter 70 is a graphics processor for fast screen updates and animation, acting as a hardware graphics subroutine for the CPU 30 or DSP 74. It executes commands written by the CPU 30 and the DSP 74 into memory. It can perform arbitrarily long sequences of graphics operations by reading new command sets from system memory 33. It becomes bus master through blitter program operation, and can therefore have exclusive control of the SYSTEM' bus 34 for considerable periods. However, its priority over the CPU 30 is not absolute; it can be requested to give up the SYSTEM' bus 34 to the CPU 30 when an interrupt occurs. The CPU 30 is the lowest priority bus master at the system level; however, it has complete control of the other hardware, therefore, the use of the SYSTEM' bus 34 is entirely under CPU 30 program control.

The blitter 70 has a versatile comparator to allow intelligent blitting operations, and a logic function unit (LFU) to generate the output data. The logic function unit can combine the contents of the data registers in a number of useful ways to produce the output data and the comparator can perform certain comparisons on the data to inhibit write operations, and optionally stop blitter operation.

The logic function unit generates the output data, which is written to the destination in system memory 33. It can perform any logical combination of the source and destination register pixels. "Source data pixels" can be selected from either of the source data register or the data pattern data register. The LFU selects any of the four Boolean minterms (A & B, $\overline{A}$ & B, A & $\overline{B}$, and $\overline{A}$ & $\overline{B}$) of the two sets of input data from the data registers, and generates the logical OR of the two selected minterms. This allows any logical combination of input data; thus 16 functional possibilities exist.

The comparator can perform a variety of comparisons on the data in the source, destination, and pattern data registers. If its comparison conditions are met, then it generates an inhibit signal. The inhibit signal is used to inhibit a write operation, and optionally, to stop the blitting operation. The comparator can also be used to provide a pixel plane effect, to give transparent colors, for collision detection and system memory 33 search operations, and as an aid to character painting.

The DSP 74 is a simple, very high-speed processor for sound synthesis, operating at up to 33 million instructions per second (MIPs). It has access to the SYSTEM' bus 34 via a DSP DMA controller (not shown), which allows it to read and write bytes or words into system memory 33. These transfers occur in short bursts, and are under DSP program control. The DSP 74 actually executes programs and stores data in its own private high-speed memory 76.

The DSP 74 audio coprocessor is a general purpose arithmetic coprocessor with sufficient power to implement a high performance music synthesizer. Synchronous serial outputs are provided for a generation of stereo audio signals with 16 bit precision, giving a sound quality normally associated with compact disc technology. The DSP 74 is micro-programmable from the host CPU 30 and the instruction set is sufficiently flexible to enable the user to program the device to fulfill many different functions that are quite different from that of "music synthesizer." Such applications might include algorithmic speech generation, audio analysis using fast Fourier transform techniques, and three-dimensional graphics rotations. The DSP 74 uses Harvard architecture (separate program and data buses) for maximum data throughput. The DSP 74 has an arithmetic logic unit (ALU), which features a hardware 16-bit by 16-bit hardware multiply/accumulate as well as addition, subtraction, and logical functions. There is also a separate serial divide unit, which generates one quotient bit per tick.

The ALU within the DSP 74 is a 16-bit arithmetic logic unit, with the same functions as a Texas Instruments 74181, which is well known in the art. Common arithmetic operations are encoded as instructions; uncommon instructions can be performed by directly setting up the ALU mode bits with the general purpose arithmetic instruction (GAI).

The DSP 74 has a DSP memory 76 associated with it. The DSP memory 76 comprises program RAM, data RAM, a register/constant table, and a sine ROM (all not shown). The DSP memory 76 in general is accessible in both the DSP's internal address space as well as the address space of the system memory 33. The DSP program RAM is 512 18-bit words. These locations can only be written by the CPU 30, and are program read-only as far as the DSP 74 is concerned. Program RAM does not appear in the DSP internal address space. The program RAM is not accessible to the host when the DSP 74 is running, but is accessible when the DSP is idle.

The DSP 74 also has a serial audio digital-to-analog convertor (DAC) interface. The serial DAC interface allows the DSP 74 to both drive a synchronous serial ($I^2S$ or similar) DAC, and to input data from a synchronous serial data source such as a CD drive.

Figure 1C:
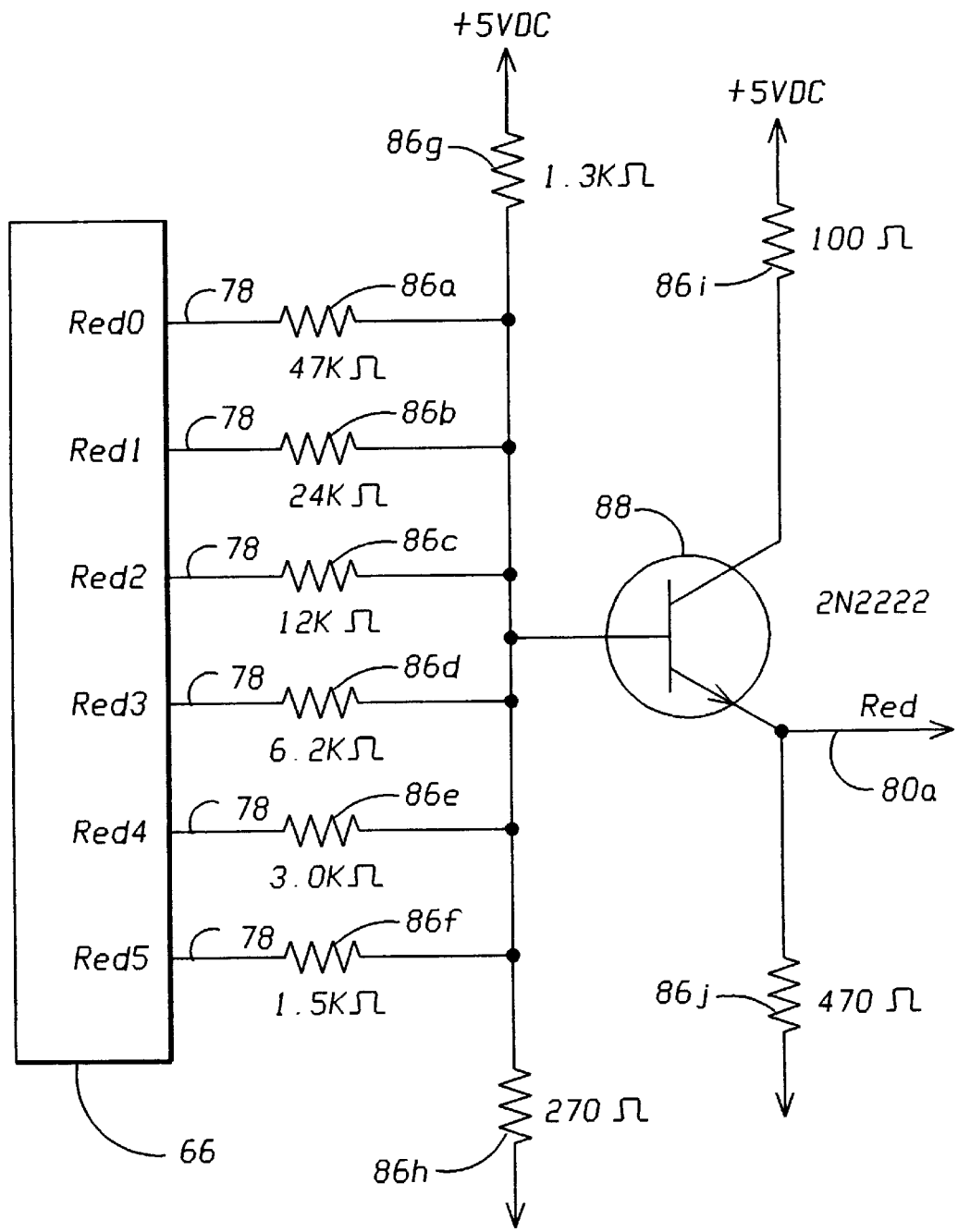
FIG. 1C is a schematic diagram showing the details of the video digital to analog converter used in the system of the present invention.

The video controller 66 of the A/V controller/coprocessor 32 connects to the external video DAC 50, which converts the eighteen bits of pixel information 78 (six bits each of red, green, and blue) from the video controller 66 into an RGB signal 80, as is well known in the art. Each color channel (R 80a, G 80b, and B 80c) of the video DAC 50 is implemented with an R2R resistor tree and a 2N2222 transistor, as shown in FIG. 1C. The devices in FIG. 1C are in circuit communication, as shown. The resistors 86a–86j in FIG. 1C are all 0.25 watt resistors with the values shown, within 5% tolerance. The transistor 88 is a 2N2222.

Referring once again to FIG. 1 B, the RGB signal 80 is converted to an NTSC composite video signal 90 by the NTSC/PAL encoder 52. The NTSC/PAL encoder 52 accepts the chroma clock 92, the HSYNC and VSYNC signals 94, which are generated by the video controller 66 of the A/V controller/coprocessor 32, and the red 80a, green 80b, and blue 80c video outputs, which are generated by the video DAC 50, and generates a composite video signal 90 in the well known NTSC or baseband video format. In the alternative, the well known PAL (European television signal standard) format can be generated. The composite video signal 90 is connected to external devices with a single female RCA type phono jack (not shown), as is well known in the art. In the preferred embodiment, the NTSC/PAL encoder 52 is a CXA1145, manufactured by Sony Corp. In the alternative, an MC1377, manufactured by Motorola Corp. can be used.

The audio ADC/DAC/CODEC 54 is linked to the DSP 74 with a serial link 96 conforming to the well known Philips $I^2S$ protocol. The ADC/DAC/CODEC 54 converts analog data to digital data, and vice versa, and compresses and decompresses digital data. The ADC/DAC/CODEC 54 interfaces external stereo analog data 97a–97b from optional microphones to the A/V controller/coprocessor 32. The audio inputs 97a–97b are connected to external devices with a standard stereo ¼" connector. The audio ADC/DAC/CODEC 54 also interfaces digital data from the A/V controller/coprocessor to external devices by generating left and right audio line out signals 98a–98b. These signals 98a–98b are connected to external devices, such as optional speakers (not shown) with two female RCA phone jacks, as are well known in the art. As mentioned below, the audio line signals 98a–98b are also added to the RF video signal 22.

In the preferred embodiment, the ADC/DAC/CODEC 54 is a CS4216, manufactured by Crystal Semiconductor. The part contains microphone inputs, with programmable gain, as well as outputs with programmable attenuators. Gain and attenuation are both programmably controlled by the DSP 74.

In the alternative, the ADC/DAC/CODEC 54 can be replaced with a TDA1311 DAC manufactured by Philips. If this chip is used, the ADC and CODEC functions will not be available.

The RF modulator 56 merges the composite video signal 90 from the NTSC/PAL encoder 52 with the left and right audio line out signals 98a and 98b from the audio ADC/DAC/CODEC 54 onto a carrier frequency to generate an RF video signal 22 that is suitable for being directly inputted into the TV 16. To generate the different PAL (European television signal standard) and NTSC formats a different RF modulator and crystal must be used. The RF video signal 22 is connected to external devices with a single female Type F coaxial connector, as is well known in the art.

The system reset is implemented by giving the I/O coprocessor 36 control over the reset signal of the A/V controller/coprocessor 32, which in turn controls the reset signal of the CPU 30. The CPU 30 can command the I/O coprocessor 36 to reset the system 10 by causing the I/O coprocessor 36 to reset the A/V controller/coprocessor, which in turn resets the CPU 30. The CPU causes the I/O controller to generate a system reset by writing the byte OFFH to I/O port AS0. In addition, the I/O coprocessor 36 monitors the optional reset switch (not shown) for the system and resets the system when it detects a switch closure.

Figure 2:
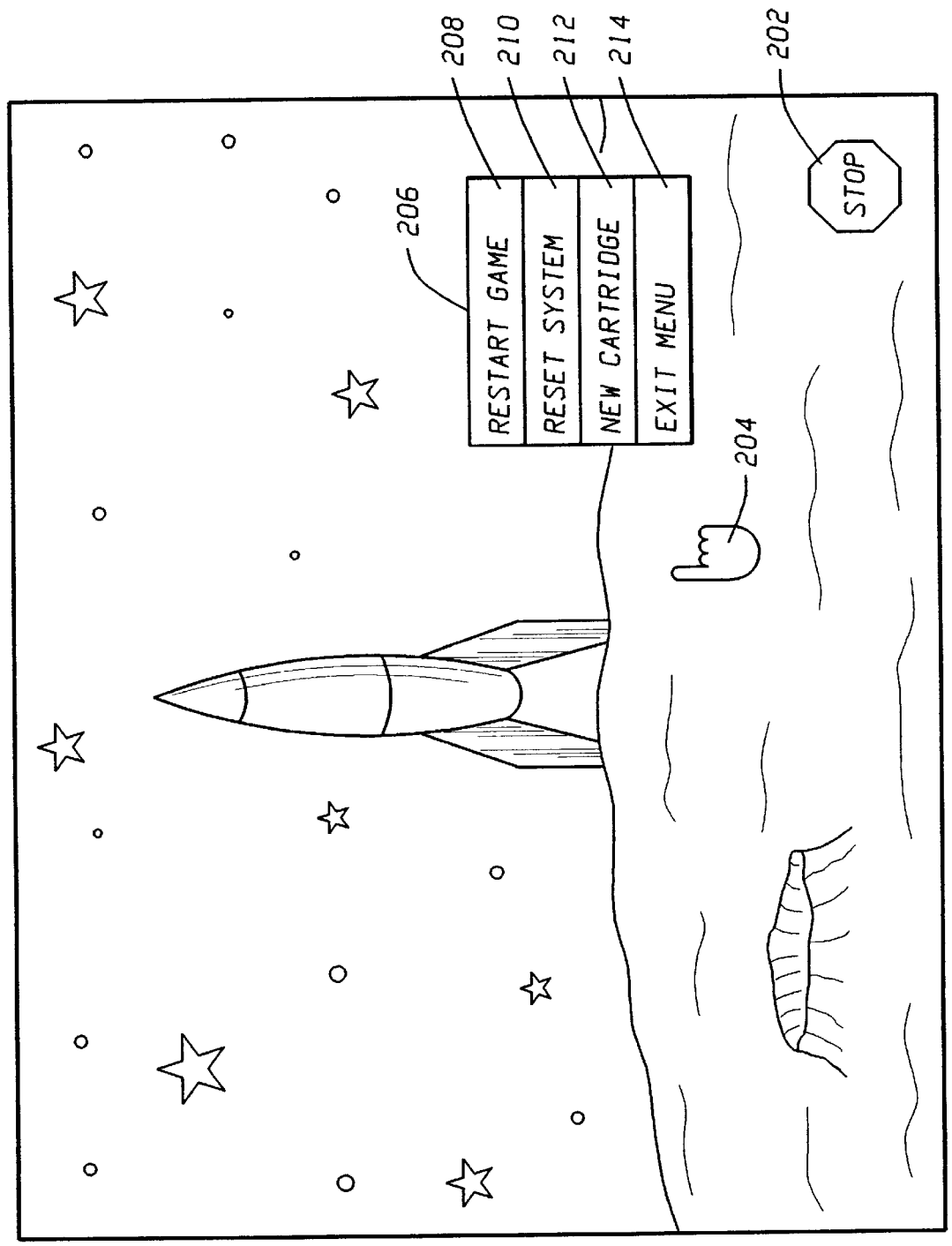
FIG. 2 is an illustration of a typical application screen in the form of a game screen.

Referring now to FIG. 2, a screen display 200 illustrative of the type which may appear on system display 16 is shown. Also illustrated in FIG. 200 is a System Management icon 202, a movable pointing icon 204, and a relocatable System Management Menu 206 with several System Management Options 208–214. In the illustrated embodiment, the System Management icon is shown as "stop sign," but may also be any other like symbol, such as an "exit sign." The System Management icon 202 functions to call up and display the System Management Menu upon user selection thereof. Furthermore, the illustrated embodiment maintains the System Management icon 202 in the screen foreground, thus making it always available to the user.

The System Management Menu 206 includes the following options: Restart Game 208, Reset System 210, New Cartridge 212, and Exit Menu 214. The System Management Menu 206 is of a "window" like nature and displayable only when active. Furthermore, System Management Menu may appear anywhere on screen 200 and always appears in the foreground.

The movable pointing icon 204 is shown as a hand symbol, but may take the form of any appropriate symbol or shape, such as an arrow, rocket, or sign. The moveable pointing icon 204 is generated when the user desires to access the System Management icon 202 and thereby the System Management Menu 206. In the illustrated embodiment, the user must generate a control event, by for example depressing a "reset button" or the like, to inform the system 10 that the user desires to access the System Manager. The need for the generation of a control event arises from the fact that in certain application programs, such as games, the entire screen 200 is required and it thus becomes undesirable to allow the user to access the System Management icon directly. In such cases, the System Management icon 202 may be hidden from display, appearing only when the user generates a control event indicating access is desired.

Yet other application programs may allow maintain the System Management icon 202 on the screen 200 at all times and allow the user to access without generation of a control event. In such cases, application program's normal pointing icon (i.e. game character, or symbol) may be used to select the System Management Icon and also selection from the System Management Menu.

Collectively, the System Management icon 202, System Management menu 206, and the movable pointing icon 204 form an interface to the System Manager. The System Management icon 202 allows a user to access System Management menu 206 via the movable pointing icon 204. Once the System Management menu 206 is displayed, the movable pointing icon 204 is used by the user to select from the plurality of System Management Options 208–214. The user is now allowed to effectively control the computer system 10's operating system from within an application program.

Figure 3:
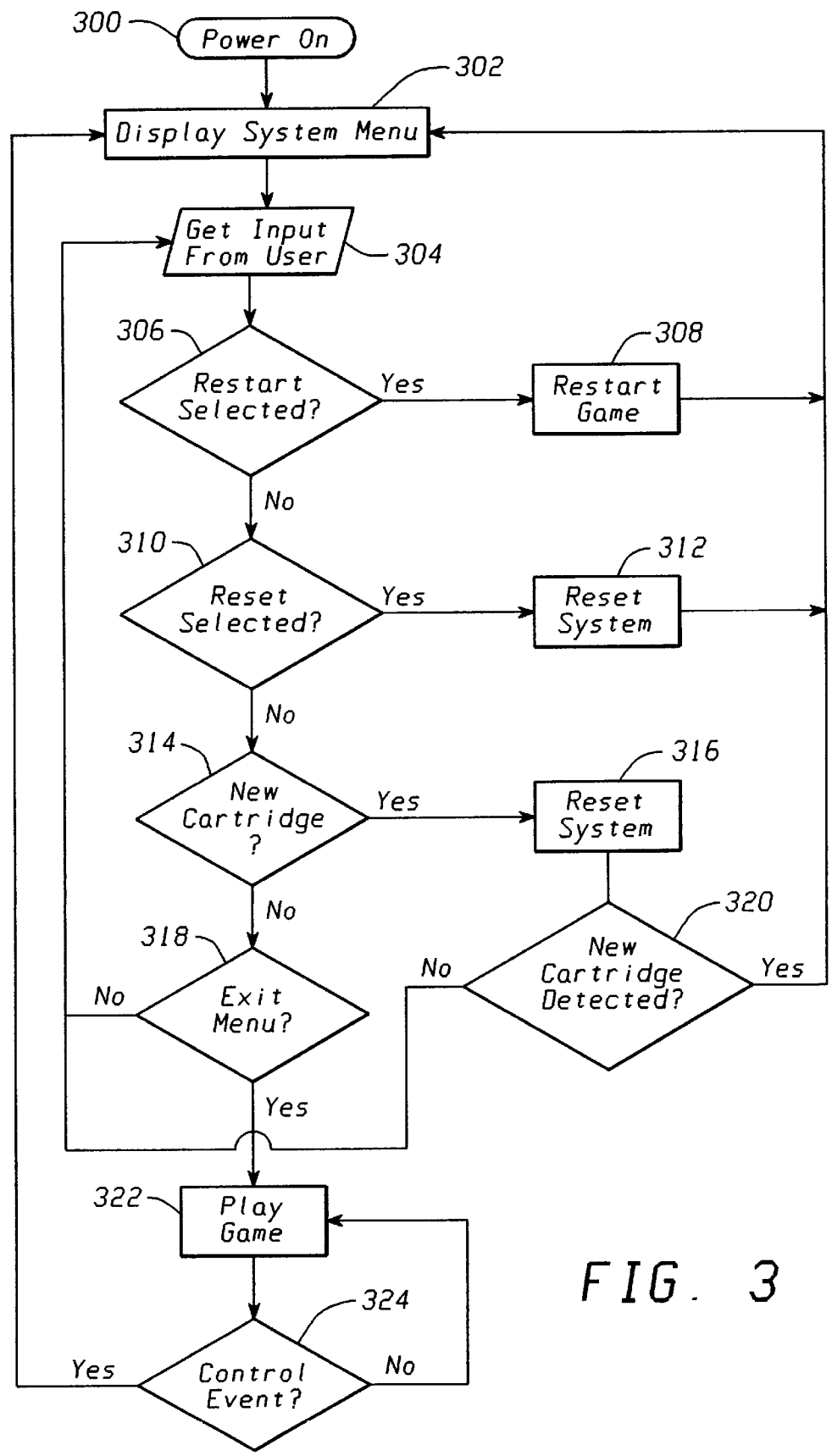
FIG. 3 is a flowchart illustrating the System Management routine of the present invention.

Referring now to FIG. 3, a flowchart illustrating the System Management routine is shown. The routine starts at Step 300, which is Power On, and proceeds to Step 302. After power on, Step 302 displays the System Management Menu 206 on display 16 and Step 304 awaits user selection from the System Management Menu 206. User selection is accomplished by the user positioning movable pointing icon 204 over the desired menu selection and then performing a "click" or button depression.

If the user selects "Restart Game," (in Step 306), the routine proceeds to Step 308 where the CPU 30 is instructed to jump to the first instruction of the currently running application program (i.e. the game) in Step 308. If the user does not select "Restart Game", the routine proceeds to Step 310.

If the user selects "Reset System," (in Step 310), the routine proceeds to Step 312 where the CPU 30 generates a reset system signal which directs the I/O processor 36 to reset the computer system 10. Recall that the I/O processor 36 has control over the computer system reset via a CPU generated reset signal to I/O port AS0. If the user does not select "Reset System," the routine proceeds to Step 314.

If the user selects "New Cartridge," (in Step 314), the routing proceeds to Step 316 where CPU 30 operation is interrupted. The CPU 30 now monitors the cartridge sense and expansion sense signals for determining the presence, absence, or change of program memory cartridge 14 in Step 320. Once a new program memory cartridge is sensed, the routine jumps to Step 302 and once again displays the System Management Menu 206 on the display 16. If after selecting "New Cartridge," the user does not wish to change program memory cartridges, the user may simply send an input to the computer system 10 via input device 18 and the routine will jump to Step 304 and allow the user to make another selection.

If the user selects "Exit Menu," (in Step 318) the routine proceeds to Step 322 and the application program continues in its normal execution. As part of the normal execution, the application program continuously instructs the CPU 30 and/or I/O processor to monitor I/O data for the occurrence of a control event. A control event can be defined as a predetermined data input (such as reset button, or the like) which indicates that the user desires the System Manager to become active. Upon the occurrence of a control event, the routine jumps to Step 302 where program execution is suspended and the System Management Menu 206 is displayed on display 16. As was described previously, the user may now select from the displayed options on the System Management Menu 206.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art.

For example, the System Management Menu many allow for selection of multiple cartridges. Therefore, the invention in its broader aspects is not limited to the specific details, representative apparatus and method, and illustrative examples shown and described. Accordingly, departures may be made from such details without departing from the spirit or scope of the applicant's general inventive concept.

I claim:

1. A computer system comprising:

(a) a central processing unit (CPU);

(b) a removable memory circuit having an application program, said removable memory circuit in circuit communication with said CPU;

(c) a video circuit in circuit communication with said CPU and said memory for generating an electrical signal corresponding to a visual image to be displayed on a video display device;

(d) an I/O coprocessor in circuit communication with said CPU and comprising logic for determining when a removable memory circuit has been removed from the computer system and a new removable memory circuit has been inserted into the computer system;

(e) a system manager interface for controlling said computer system operation wherein said system manager interface comprises:

(1) logic for generating and displaying a system management menu upon the determination that a removable memory circuit has been removed and a new removable memory circuit has been inserted into the computer system;

(2) logic for generating and displaying the system management menu upon selection of a system management icon on said visual display device; and (3) logic for sending a reset command from said CPU to said I/O coprocessor upon selection of a reset menu option in said system management menu to thereby reset said computer system.

2. The computer system of claim 1 wherein the selectable menu includes an option to restart said program.

3. The computer system of claim 1 wherein the selectable menu includes an option to insert a new removable memory cartridge.

4. The computer system of claim 1 wherein the computer system includes a movable icon for selecting said system manager interface.

5. In a removable program memory based computer system having a central processing unit (CPU), a video circuit in circuit communication with said CPU and said memory for generating an electrical signal corresponding to a visual image to be displayed on a video display device, and a peripheral interface circuit in circuit communication with said CPU for interfacing signals from external devices to said CPU, a system manger comprising:

(a) an interface for selecting system management options;

(b) a system management icon for displaying the availability of system management options, (c) a selectable menu for displaying which system management options are available for selection;

(d) logic for generating and displaying a system management menu upon a determination that a removable memory circuit has been removed and a new removable memory circuit has been inserted into the computer system;

(e) logic for generating and displaying the system management menu upon selection of said system management icon on said visual display device; and (f) logic for sending a reset command from said CPU to said I/O coprocessor upon selection of a reset menu option in said system management menu to thereby reset said computer system.

6. The system manager of claim 5 wherein said interface comprises a movable icon, said icon displayable on said video display device.

7. The computer system of claim 5 wherein the selectable menu includes an option to restart said program.

8. The computer system of claim 5 wherein the selectable menu includes an option to insert a new removable memory cartridge.

9. In a removable program memory based computer system having a central processing unit (CPU), a removable memory, an audio/video controller/coprocessor in circuit communication with said CPU and said memory for generating an electrical signal corresponding to a visual image to be displayed on a video display device, and an I/O coprocessor in circuit communication with said CPU and said audio/video controller/coprocessor and for interfacing signals from external devices to said CPU and for controlling the reset of the computer system, a method of resetting said system comprising the steps of:

(a) determining whether the removable memory has been substituted for another removable memory;

(b) responsive to a determination that the removable memory has been substituted for another removable memory, displaying a system management menu on said video display device;

(c) responsive to a selection of a reset menu option in said system management menu, sending a reset command from said CPU to said I/O coprocessor; and (d) responsive to a reset command sent to said I/O coprocessor, causing said I/O coprocessor to generate a system reset command.

10. The method of claim 9 further comprising the steps of:

(a) displaying a system management icon for indicating the availability of system management options; and (b) responsive to a selection of the system management icon, displaying the system management menu.

11. The method of claim 9 wherein the step of displaying a system management menu on said video display device responsive to a determination that the removable memory has been substituted for another removable memory comprises the step of displaying a restart game menu option, a reset computer system menu option, a new cartridge menu option and an exit menu option.

12. The method of claim 9 wherein the step of causing said I/O coprocessor to generate a system reset command responsive to a reset command sent to said I/O coprocessor comprises the step of causing the I/O coprocessor to reset said video/audio controller/coprocessor thereby resetting said CPU.

13. The method of claim 10 wherein the step of displaying a system management icon for indicating the availability of system management options comprises the step of continuously displaying the system management icon through execution of a gaming application by the computer system.

* * * * *